United States Patent [19]
Hamlin

[11] Patent Number: 4,858,606
[45] Date of Patent: Aug. 22, 1989

[54] LOW PRESSURE BREATHING REGULATORS AND BREATHING GAS SYSTEMS INCORPORATING THE SAME

[75] Inventor: Humphrey A. S. Hamlin, Montacute, England

[73] Assignee: Normalair-Garrett (Holding) Systems

[21] Appl. No.: 104,888

[22] Filed: Oct. 6, 1987

[30] Foreign Application Priority Data

Oct. 9, 1986 [GB] United Kingdom ............ 8624230

[51] Int. Cl.$^4$ .................. A62B 7/14; A62B 21/00
[52] U.S. Cl. .................. 128/204.29; 128/205.24; 128/204.23; 128/204.22
[58] Field of Search ............ 128/202.22, 204.18, 128/204.21, 204.29, 204.24, 205.24, 1 A, 204.23

[56] References Cited

U.S. PATENT DOCUMENTS

| | | | |
|---|---|---|---|
| 2,552,595 | 5/1951 | Seeler | 128/204.29 |
| 3,545,465 | 12/1970 | Zadoo | 128/1 A |
| 4,336,590 | 6/1982 | Jacq et al. | 128/1 A |
| 4,499,914 | 2/1985 | Schobler | 128/204.29 |
| 4,619,255 | 10/1986 | Spinosa et al. | 128/205.24 |
| 4,638,791 | 1/1987 | Krogh et al. | 128/1 A |
| 4,651,728 | 3/1987 | Gupta et al. | 128/204.29 |
| 4,687,013 | 8/1987 | Stevenson | 204.24/ |

FOREIGN PATENT DOCUMENTS

| | | | |
|---|---|---|---|
| 0078644 | 5/1983 | European Pat. Off. | 128/204.29 |
| 0129304 | 12/1984 | European Pat. Off. | 128/204.29 |

Primary Examiner—Edgar S. Burr
Assistant Examiner—Kimberly L. Asher
Attorney, Agent, or Firm—Larson and Taylor

[57] ABSTRACT

A breathing regulator suitable for regulating aircrew breathing demand for oxygen-enriched air supplied as breathing gas by an aircraft on-board oxygen generating system includes a valve responsive to pneumatic signals from an aircraft mounted, G sensitive valve. The valve throttles passage of gas from a breathing-pressure control chamber to ambient atmosphere so that in high or rapidly increasing G load conditions the pressure in the breathing-pressure control chamber is increased and a positive delivery pressure is provided at the regulator outlet.

5 Claims, 4 Drawing Sheets

LOW PRESSURE BREATHING REGULATORS AND BREATHING GAS SYSTEMS INCORPORATING THE SAME

BACKGROUND OF THE INVENTION

1. Field of the Invention

This invention relates to low pressure breathing regulators for use in aircraft breathing gas systems.

2. Description of the Prior Art

In many present day aircraft, oxygen-enriched air is supplied as breathing gas for an aircrew member by an on-board oxygen generating system (OBOGS) comprising a molecular sieve oxygen generating system (MSOGS) arranged to deliver oxygen-enriched air of desired oxygen concentration value by adsorbing nitrogen from air fed to the system. Oxygen-enriched air produced by either system is delivered to an aircrew breathing mask by way of a demand valve breathing regulator. A problem was found to exist with respect to demand valve operation in a breathing regulator suitable for accommodating the lower range of oxygen-enriched air pressure available from a MSOGS, particularly at the lower end towards 70 kPa (10 psi).

This problem was overcome by a breathing regulator disclosed in EP-A No. 0,078,644 (Normalair-Garrett) which embodies a diaphragm arranged for sensing breathing demand and actuating, via a lever, a pressure balanced demand valve. The diaphragm separates a demand-pressure sensing chamber from a breathing-pressure control chamber having communication by way of an aneroid valve with a cabin-pressure sensing chamber. A controlled bleed is provided from the demand-pressure sensing chamber to the breathing-pressure control chamber, in the particular embodiment of EP-A-0,078,644 the bleed being by way of an orifice in the diaphragm, and pressure in the breathing-pressure control chamber is controlled by the aneroid valve which allows gas to pass from the breathing-pressure control chamber to the cabin-pressure sensing chamber from which it is discharged to the cabin by way of an outlet in the cabin-pressure sensing chamber. When the aircraft operating altitude exceeds 12,000 meters (40,000 feet) the aneroid valve expands to increasingly restrict the flow of gas from the breathing-pressure control chamber. This causes the pressure in the breathing-pressure control chamber to increase thereby increasing the pressure of the breathing gas at the regulator outlet and hence in a breathing mask connected to the regulator outlet. This ensures that breathing gas is supplied at a pressure greater than aircraft cabin ambient pressure so that the minimum critical oxygen pressure is maintained in the lungs of the aircrew member breathing the gas. This is referred to in the art as positive pressure breathing.

It is known that protection against rapid and high increases of G loads, e.g. 3.5G to 9G, such as are experienced by an aircrew member during aircraft maneuvers where large accelerative forces occur, is enhanced by positive pressure breathing. The increase in breathing pressure causes an approximately equal increase in heart level blood pressure, thereby increasing the flow of blood to the brain.

There is a requirement, therefore, for a breathing regulator suitable for use with breathing gas delivered by a MSOGS and which will provide positive pressure breathing to aid in protecting an aircrew member against the effects of increasing G loads experienced during highly accelerative maneuvers of his aircraft irrespective of the altitude at which the aircraft is operating.

Also, it has been found that in certain conditions, such as when sudden and rapid increases of G load occur, an aircrew member will make a rapid deep inhalation to fill his lungs. In so doing he may draw all the oxygen-enriched air from the outlet and the demand-pressure sensing chamber of the regulator disclosed in EP-A-0,078,644. This causes the diaphragm separating the demand-pressure sensing chamber from the breathing pressure control chamber to move towards the bottom of the demand-pressure sensing chamber and significantly reduces the pressure in the breathing-pressure control chamber. This pressure will only rebuild slowly during which period the regulator is rendered inoperative.

SUMMARY OF THE INVENTION

It is an object of the invention to provide a breathing regulator for controlling supply of breathing air to an aircraft aircrew member which will provide positive pressure breathing as an aid to enhancing protection of the aircrew member when he is subjected to large accelerative forces giving rise to rapid and high increases in G load.

It is another object of the invention to provide an aircraft on-board oxygen generating system for supplying oxygen-enriched air for breathing by an aircraft aircrew member which system includes such a regulator.

Accordingly, in meeting the first aforementioned object, the present invention provides a breathing regulator for controlling delivery of breathing air in accordance with breathing demands of an aircrew member, comprising a regulator body having an inlet for receiving a flow of breathing air and an outlet for delivering breathing air to a face mask worn by an aircraft aircrew member, a demand valve for controlling flow of said breathing air through the regulator body from the inlet to the outlet, a demand-pressure sensing chamber having communication with the outlet, a breathing-pressure control chamber having communication with aircraft cabin atmosphere ambient of the regulator, a diaphragm dividing the demand-pressure sensing chamber from the breathing-pressure control chamber, means connecting the diaphragm with the demand valve for opening movement of the demand valve in response to breathing demand sensed in the demand-pressure sensing chamber, means for supplying a bleed of breathing air to the breathing-pressure control chamber, and valve means for restricting flow of breathing air from the breathing-pressure control chamber to ambient, in response to signals received from a G-sensitive valve mounted in the aircraft in which the regulator is installed, whereby pressure in the breathing-pressure control chamber is increased to provide a delivery pressure at the regulator outlet appropriate to positive pressure breathing during periods of high or rapidly increasing G load.

In obtaining the second object, the invention provides an aircraft on-board oxygen generating system (OBOGS) for supplying oxygen-enriched air for breathing by an aircrew member, including a molecular sieve oxygen generating system (MSOGS), a breathing regulator having an inlet connected for receiving a flow of oxygen-enriched air of required composition delivered by the MSOGS and an outlet for delivering oxygen-enriched breathing air to a face mask worn by the aircrew member, the breathing regulator further comprising a demand valve for controlling flow of oxygen-enriched air through the regulator from the inlet to the outlet in response to breathing demands of the aircrew member, a demand-pressure sensing chamber for sensing breathing demands of the aircrew member, a breathing-pressure control chamber, a diaphragm separating the demand pressure sensing chamber from the breathing-pressure control chamber, means connecting the diaphragm with the demand valve for movement of the demand valve to an open position in response to breathing demands, means for passing a bleed of oxygen-enriched air to the breathing-pressure control chamber to build up a control pressure therein, means for communicating the breathing-pressure control chamber with aircraft cabin pressure, whereby oxygen-enriched air may flow out of the breathing-pressure control chamber, and valve means for restricting flow of oxygen-enriched air from said breathing-pressure control chamber in response to signals received from a G sensitive valve mounted on the aircraft so that pressure in the breathing-pressure control chamber is increased to provide a delivery pressure at the regulator outlet appropriate to positive pressure breathing during periods of high or rapidly increasing G load.

Under rapid rates of change of G load, such as a rapid reduction in G load, the control pressure in the breathing-pressure control chamber may be destroyed causing the regulator to become inoperative so that the aircrew member is starved of breathing air until pressure in the breathing-pressure control chamber rebuilds.

In avoidance of this problem, one embodiment of the present invention further provides means for by-passing said valve means whereby a metered flow of pressurized air from the G sensitive valve may flow to the breathing-pressure control chamber to maintain control pressure therein under high or rapidly changing G load conditions.

The by-pass means may be embodied in the valve means and may comprise a ball non-return valve or a flap non-return valve arranged for closing a passageway through a valve stem and valve head of said valve means.

BRIEF DESCRIPTION OF THE DRAWINGS

The invention will now be further described by way of example and with reference to the accompanying drawings, in which.

DETAILED DESCRIPTION OF THE DRAWINGS

Figure 1:
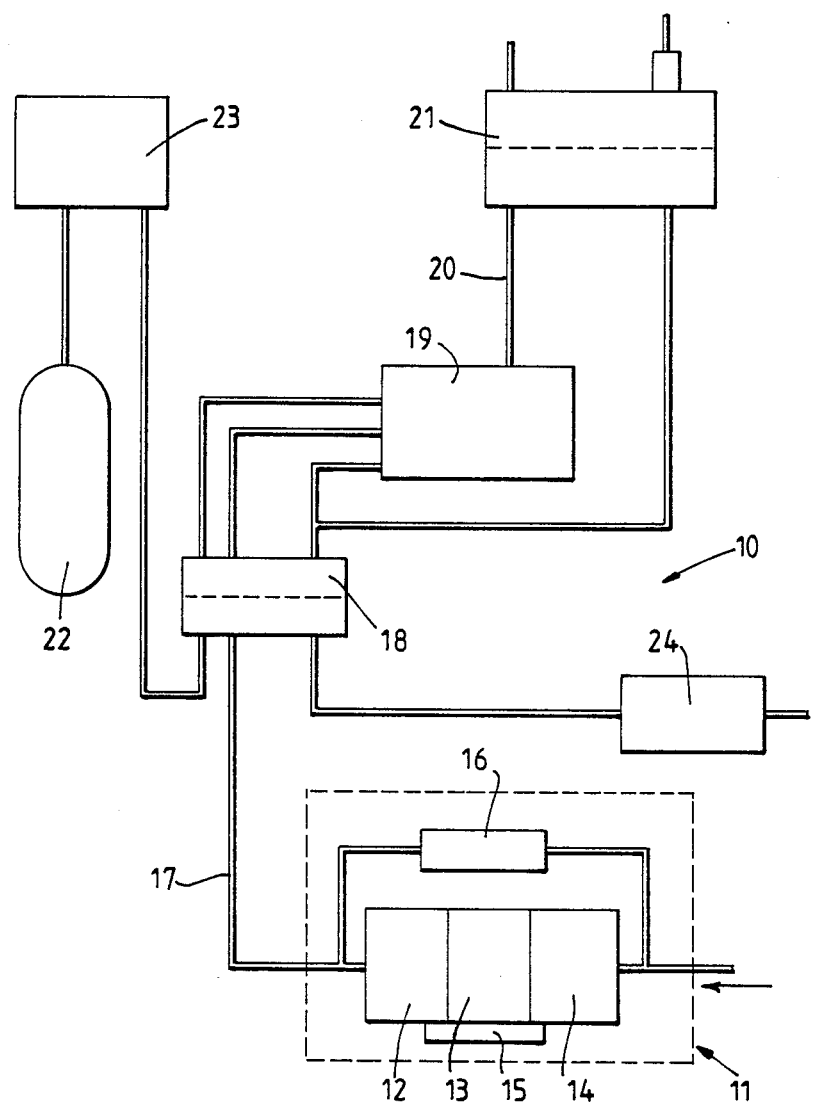
FIG. 1 is a diagrammatic illustration of an OBOGS in accordance with one embodiment of the invention.

In an aircraft on-board oxygen generating system (OBOGS) 10, as shown schematically in FIG. 1, oxygen-enriched air for breathing by an aircrew member is supplied by a molecular sieve oxygen generating system (MSOGS) 11 comprising three molecular sieve beds 12, 13, 14 suitably interconnected and controlled by an electronic control unit 15 and oxygen concentration sensor 16 such as is disclosed in EP-A No. 0,129,304. The MSOGS receives a bleed of air from an engine (not shown) of an aircraft in which the OBOGS is installed and outputs oxygen-enriched air which is delivered by a supply line 17, and by way of a services connector 18, to a breathing regulator 19. The breathing regulator 19 is connected by a delivery line 20 to a personal equipment connector 21 which provides a single point attachment for all services between an aircraft seat (not shown) and the aircrew member. The OBOGS also includes a standby oxygen cylinder 22 containing 100% oxygen and a control panel 23 providing indications and switching/selection mechanisms required by the crew member, including safety pressure selection, press-to-test, standby oxygen manual selection, automatic selection of 100% oxygen in the event of cabin decompression at high altitude and dolls-eye blinker breathing indication.

An electro-pneumo-mechanical G sensitive valve 24, hereinafter referred to as an anti-G valve, is attached to the aircraft structure (not shown) and provides a pneumatic signal for inflation of a lower garment, or G-suit (not shown) worn by the aircrew member for protection against G loads as is well known.

In accordance with the present invention the pneumatic signal from the anti-G valve 24 is also fed to a valve (not shown in FIG. 1) controlling pressure in a breathing-pressure control chamber of the breathing regulator 19 by throttling discharge of gas from that chamber to aircraft cabin atmosphere. Pressure in the breathing-pressure control chamber is further controlled, but not necessarily simultaneously, at high altitudes, say above 12,000d meters (40,000 feet) by an aneroid capsule-mounted valve which also acts to throttle escape of gas from the breathing-pressure control chamber to aircraft cabin atmosphere. Thus, what is termed positive pressure breathing (PPB) is automatically selected and varied to a predetermined schedule by use of the aneroid-mounted valve which provides protection up to 21,000 meters (70,000 feet), and PPB is also occasioned by a signal from the anti-G valve 24, the PPB pressure being proportional to the signal from the anti-G valve.

A demand valve breathing regulator in accordance with an embodiment of the present invention, and suitable for use in the OBOGS hereinbefore described with reference to FIG. 1, will now be described with reference to FIGS. 2, 3 and 4.

Figure 2:
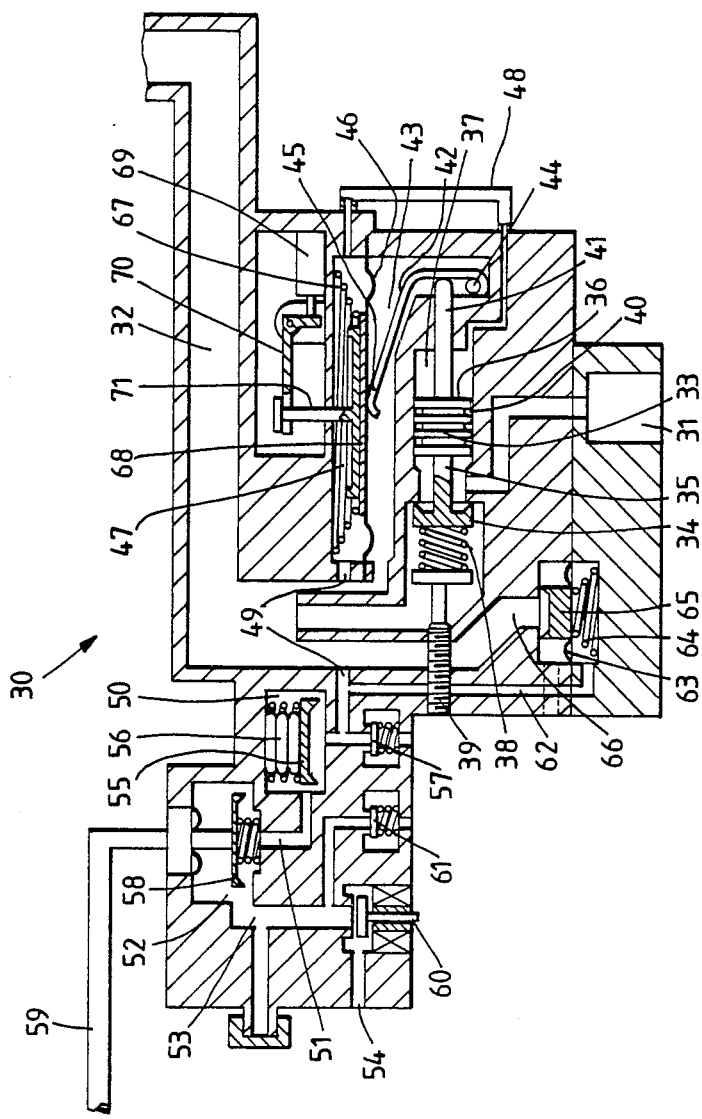
FIG. 2 is a schematic illustration of a breathing regulator in accordance with another embodiment of the invention and suitable for use in the OBOGS shown in FIG. 1.

Referring first to FIG. 2, a regulator 30 comprises a body having an inlet 31 for receiving oxygen-enriched air from a MSOGS and an outlet 32 for delivering the oxygen-enriched air to a face mask (not shown) of an aircrew member. Flow of oxygen-enriched air through the regulator 30 is controlled by a demand valve arrangement including a demand valve 33 having a valve head 34 supported by a spindle 35 from a spool 36 which slides in a bore 37 in the regulator body. The valve head 34 is urged towards a closing position by a compression spring 38 acting between the valve head and a threaded adjuster 39. The opposed surface areas of the valve head 34 and the spool 36 are equal so that the valve 33 is balanced by the pressure of the oxygen enriched air entering the inlet 31. The spool 36 is provided on its circumferential surface with grooves in the manner of a labyrinth seal 40 and a second spindle 41 projects from the end surface of the spool opposite the end surface from which the spindle 35 projects. The end of the spindle 41 contacts a valve operating lever 42 housed in a demand-pressure sensing chamber 43 and arranged to rock about one of its ends 44. The other end 45 of the lever 42 bears on the center of a diaphragm 46 which divides the demand-pressure sensing chamber 43 from a breathing-pressure control chamber 47.

The demand-pressure sensing chamber 43 is arranged to be open to pressure at the outlet 32 whilst the breathing-pressure control chamber 47 is arranged to receive a bleed of oxygen-enriched air. In this embodiment the bleed of oxygen-enriched air is delivered by way of a passageway 48 which connects between the closed end of the bore 37 in which the spool 36 slides and the breathing-pressure control chamber 47, and is supplied by way of leakage of oxygen-enriched air past the labyrinth seal 40 of the spool 36; however, the bleed could be supplied in another manner such as, for example, by an orifice in the diaphragm 46. The breathing-pressure pressure control chamber is arranged to be open to aircraft cabin pressure by way of a passageway 49, a chamber 50, a passageway 51, a chamber 52, a passageway 53 and an outlet 54.

The chamber 50 houses a valve head 55 carried by an aneroid capsule 56 and adapted for closing the entry of the passageway 49 into the chamber 50 whereby the pressure in the breathing-pressure control chamber 47 may be controlled in relation to cabin altitude. The passageway 49 is branched and connects with a pressure-relief valve 57 that is arranged to open when a predetermined maximum pressure occurs in the breathing-pressure control chamber 47.

The chamber 52 houses a valve 58 which is connected by way of a conduit 59 for receiving pneumatic signals output by an anti-G valve (not shown in FIG. 2), and whereby the valve 58 is pneumatically controlled to throttle passage of oxygen-enriched air to chamber 52 from the breathing-pressure control chamber by way of passageway 49, chamber 50, and passageway 53. Oxygen-enriched air passing to chamber 52 escapes to ambient by way of passageway 53 and outlet 54, the outlet 54 being closable for test purposes by a press-to-test member 60 which may be solenoid operated. The passageway 53 also connects with the cabin by way of a pressure relief valve 61.

Pressure in the breathing-pressure control chamber 47 is sensed, by way of a passageway 62 branching from passageway 49, on one side of a diaphragm 63 and together with a spring 64 acts to urge a valve head 65 carried by the diaphragm 63 towards closing a secondary outlet 66 from the outlet 32 by which oxygen-enriched air in the outlet 32 may be vented to the aircraft cabin. The valve head 65 is arranged to open when the pressure in the outlet 32 is, say, 125 Pa (0.5 inches/WG) above that in the breathing-pressure control chamber 47.

The diaphragm 46 dividing the demand-pressure sensing chamber 43 from the breathing-pressure control chamber 47 is backed by a spring 67 located in the control chamber 47. The spring 67 acts on the diaphragm 46 through a plate 68 which in an operational condition of the regulator contacts the diaphragm and through lever 42 urges the demand valve 33 towards an open position against the action of spring 38. Spring 38 is adjusted by the adjuster 39 such that when the diaphragm 46 is in a null position, the valve head 34 of demand valve 33 is held off its seat sufficiently to maintain a positive pressure (safety pressure) of 250 Pa (1 inch/WG) in the outlet 32. To prevent wastage of oxygen-enriched air during non-use of the regulator the effect of spring 67 may be negated by operation of a solenoid 69 which causes a pivotal lever 70 connected with a central spindle 71 projecting from the plate 68 to lift the plate out of contact with the diaphragm 46.

In operation of the regulator 30 shown in FIG. 2, with oxygen-enriched air available at the inlet 31, the demand valve 33 responds by movement of diaphragm 46 to inhalatory and exhalatory phases of breathing by an aircrew member wearing a face mask connected with the outlet 32 of the regulator. Breathing cycle pressure exists in the outlet 32 and demand-pressure sensing chamber 43, being sensed by the diaphragm 46. The diaphragm 46 is drawn in a downward direction, as viewed in FIG. 2, during inhalation so as to deflect the lever 42 and cause it to move the demand valve 33 to the right as viewed in FIG. 2, from the slightly preset open position, that gives the safety pressure condition, to a full flow state giving rapid maximum flow response feeding oxygen-enriched air to the outlet 32. Exhalation causes a cessation of flow and consequent pressure build-up in the outlet and the demand-pressure sensing chamber 43 to an extent where the diaphragm 46 is returned to the null position until the cycle is repeated.

Oxygen-enriched air bleeds to the breathing-pressure control chamber 47 by way of the passageway 48 and escapes therefrom to the aircraft cabin by way of passageway 49, chamber 50, passageway 51, chamber 52, passageway 53 and outlet 54.

With increasing cabin altitude (decreasing ambient pressure) from, say, 12,000 meters (40,000 feet) the aneroid capsule 56 of the aneroid-mounted valve head 55 in chamber 50, expands to move the valve head towards increasing restriction of the flow through passageway 49 into chamber 50 and hence to outlet 54. This causes pressure in breathing-pressure control chamber 47 to increase thereby increasing the pressure of the oxygen-enriched air in the outlet 32 and hence in the breathing mask of the aircrew member. Simultaneously an increasing closing pressure is applied to diaphragm 63 carrying the valve head 65 which closes the secondary outlet 66 from outlet 32.

In similar manner, when increasing G load is applied to the aircraft, the anti-G valve signals the valve 58 in chamber 52 to move towards further restricting passage of oxygen-enriched air into chamber 52 by way of passageway 51 so that the pressure in the breathing-pressure control chamber increases and, consequently, the pressure of oxygen-enriched air in outlet 32 is also increased, as previously described for operation of the aneroid valve in chamber 50, so as to be positive with respect to aircraft cabin ambient pressure in assisting the breathing effort of the aircrew member under the effects of increasing G load.

When the aircrew member is subjected to a sudden and rapid increase of G load, such as when the aircraft pulls a tight turn at low altitude, he may make a rapid and deep inhalation to fill his lungs and, in so doing, draw all of the oxygen-enriched air from the outlet 32 and demand-pressure sensing chamber 43 thereby causing the diaphragm 46 to collapse downwardly, as viewed in FIG. 2, towards the bottom of the demand-pressure sensing chamber 43. This movement significantly reduces any pressure in the breathing-pressure control chamber 47 which will only rebuild slowly due to the controlled low flow of oxygen-enriched air past the spool 36 of demand valve 33 so delaying the generation of PPB.

Similarly, when there is a rapid fall-off in G load from a high value, the valve 58 in chamber 52 may decrease restriction of passageway 51 so quickly as to allow oxygen-enriched air to flow to the aircraft cabin from the breathing-pressure control chamber 47 at a rate so much in excess of the flow into chamber 47 as to cause the diaphragm 46 to collapse upwardly, as viewed in FIG. 2, towards the top of the chamber 47. This will render the regulator inoperative until pressure in the chamber 47 rebuilds and during that period the aircrew member will be starved of oxygen-enriched air for breathing.

Figure 3:
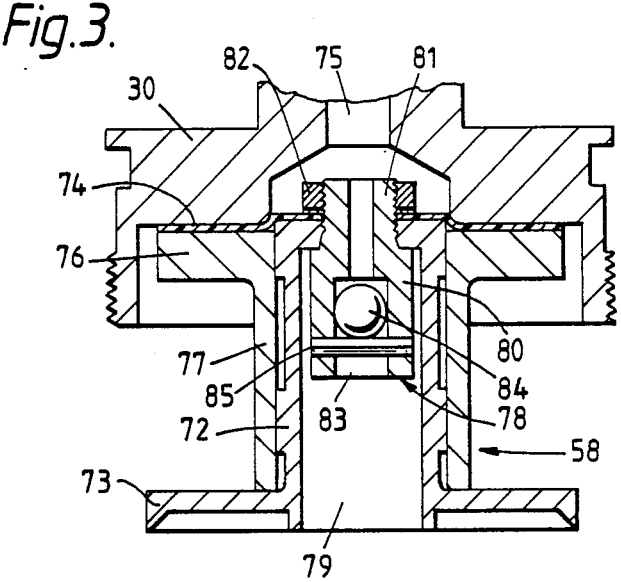
FIG. 3 is a cross-section through one valve means suitable for use in restricting flow from a breathing-pressure control chamber of the regulator shown in FIG. 2 and having a by-pass incorporating a ball non-return valve for allowing pressurized air to flow to the breathing-pressure control chamber.
Figure 4:
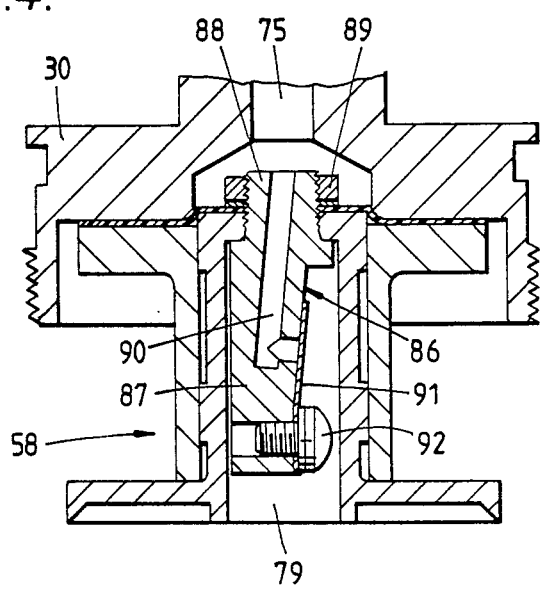
FIG. 4 is a cross-section through another valve means suitable for use in restricting flow from the breathing-pressure control chamber of the regulator but having a flap non-return valve.

In an embodiment of the present invention, these problems are avoided by manufacturing the valve 58 in chamber 52 to be of one or other of the valve constructions shown in FIGS. 3 and 4, so that a flow of air from the anti-G valve is allowed to pass through valve 58 to assist in rebuilding pressure in the breathing-pressure control chamber at the required rate to maintain satisfactory operation of the regulator.

Referring first to the valve construction shown in FIG. 3, the valve 58 comprises a hollow valve stem 72 having a valve head 73 at one end thereof. The valve 58 is carried by a diaphragm 74 which extends across an inlet 75 into the body of the regulator 30 and is trapped between the regulator body and a flange 76 of a bush member 77 in which the valve stem 72 slides. A non-return valve assembly 78 is housed internally of a bore 79 in the valve stem 72 and comprises a cylindrical body 80 projecting a threaded end 81 through an end wall of the valve stem and the diaphragm 74 for attachment thereto by a nut 82. The cylindrical body 80 has a by-pass bore 83 extending therethrough. The by-pass bore is of larger diameter at its end which opens internally of the bore 79 for receiving a non-return ball valve member 84 that is retained within the bore 83 by a cross-pin 85.

In operation, the pneumatic signal from the anti-G valve through the inlet 75 will act on the diaphragm 74 to force the valve head 73 to throttle the escape of oxygen-enriched air from the breathing-pressure control chamber of the regulator so building up pressure in the breathing-pressure control chamber. The pressure so generated will be a function of the area ratio of the area of the valve head 73 and the area of the valve stem 72, and the pressure applied at the inlet 75. Simultaneously, air from the anti-G valve will flow through the bore in the cylindrical body 80 into the breathing-pressure control chamber to supplement the oxygen-enriched air flowing into that chamber through passageway 48. This supplemental airflow ensures that the control pressure in the breathing-pressure control chamber is maintained during all excursions of the diaphragm 46.

Another function of the regulator is to provide a pressure in the mask to check mask fit. This pressure is generated by the press-to-test member 60 closing outlet 54 thereby causing pressure to build up in the breathing-pressure control chamber. This function is checked before flight when there is no flow from the anti-G valve and to prevent loss of oxygen-enriched air from the breathing-pressure control chamber the non-return ball valve member 84 is included in the by-pass bore 83 of the cylindrical body 80.

Referring now to FIG. 4, the valve 58 there shown is of similar construction to that shown in FIG. 3 but with the exception of the non-return valve assembly 86 which is of flap valve type. The non-return valve assembly 86 comprises a body member 87 housed within the bore 79 of the valve stem 72 and projects a threaded end 88 through the end wall of the valve stem 72 and diaphragm 74 for attachment thereto by a nut 89. A bore 90 enters the body member 87 at that end which faces the inlet 75 and is turned to exit the body member 87 at a location on its side surface intermediate its ends. The exit end of the bore 90 is closable by an elastomeric flap valve 91 which is secured to the body member by a screw 92.

Operation of the valve 58 together with its non-return valve assembly 86 is similar to that hereinbefore described for the valve 58 and non-return valve assembly 78 shown in FIG. 3.

Figure 5:
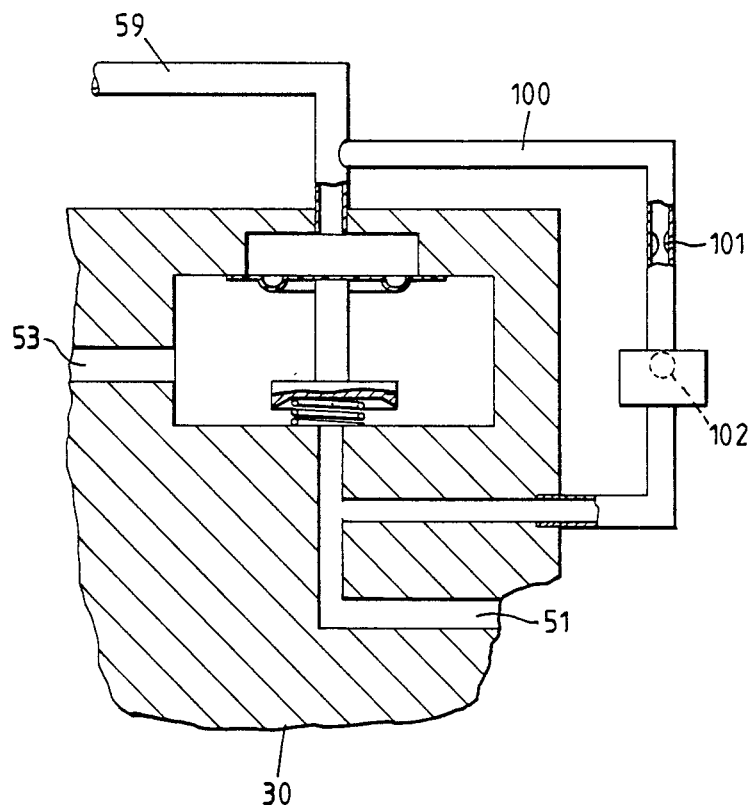
FIG. 5 is a fragmentary cross-section showing alternative means for by-passing a valve restricting flow from the breathing-pressure control chamber of the breathing regulator shown in FIG. 2.

Of course valve means, such as the valve 58 in the embodiment of FIG. 2, receiving pneumatic signals from the G sensitive valve may be by-passed in other ways, one such example being shown in FIG. 5.

Referring to FIG. 5, a by-pass conduit 100 is taken from conduit 59 and joined into the regulator body to communicate with passageway 51 on the breathing-pressure control chamber 47 side of the valve 58 thereby by-passing the valve. The conduit 100 incorporates a restrictor orifice 101 suitable for giving the required by-pass flow from the anti-G valve to the breathing-pressure control chamber, and a non-return valve 102 for purposes previously described.

Whilst the breathing regulator has been particularly described with reference to use with an OBOGS in which it receives oxygen-enriched air from a MSOGS, it may also be used in other aircrew breathing systems such as, for example, a system in which gaseous oxygen is provided by a liquid oxygen system.

What is claimed is:

1. A breathing regulator for controlling delivery of breathing air in accordance with breathing demands of an aircrew member, comprising a regulator body having an inlet for receiving a flow of breathing air and an outlet for delivering breathing air to a face mask worn by an aircraft aircrew member, a demand valve for controlling flow of the breathing air through the regulator from the inlet to the outlet, a demand-pressure sensing chamber having communication with the outlet, a breathing-pressure control chamber having communication with aircraft cabin atmosphere ambient of the regulator, a diaphragm dividing the demand-pressure sensing chamber from the breathing pressure control chamber, means connecting the diaphragm with the demand valve for opening movement of the demand valve in response to breathing demand sensed in the demand pressure sensing chamber, means for supplying a bleed of breathing air to the breathing-pressure control chamber, valve means including a valve stem and a valve head or restricting flow of breathing air from the breathing-pressure control chamber to ambient in response to signals received from a G sensitive valve mounted in the aircraft in which the regulator is installed, whereby pressure in the breathing-pressure control chamber is increased to provide a delivery pressure at the regulator outlet appropriate to positive pressure breathing during periods of high or rapidly changing G load, and means embodied in the valve means to provide a metered flow of pressurized air from the G sensitive valve to the breathing-pressure control chamber to maintain control pressure therein, said last named means comprising a passageway through the valve stem and valve head of the valve means, whereby pressure in the breathing-pressure control chamber may be rebuilt at a required rate to maintain satisfactory operation of the regulator following extreme excursions of the diaphragm.

2. A breathing regulator as claimed in 1, wherein a non-return valve is incorporated in the passageway.

3. A breathing regulator as claimed in claim 2, wherein the non-return valve comprises a ball valve.

4. A breathing regulator as claimed in claim 2, wherein the non-return valve comprises a flap valve.

5. A breathing regulator for controlling delivery of breathing air in accordance with breathing demands of an aircrew member, comprising a regulator body having an inlet for receiving a flow of breathing air and an outlet for delivering breathing air to a face mask worn by an aircraft aircrew member, a demand valve for controlling flow of the breathing air through the regulator from the inlet to the outlet, a demand-pressure sensing chamber having communication with the outlet, a breathing-pressure control chamber having communication with aircraft cabin atmosphere ambient of the regulator, a diaphragm dividing the demand-pressure sensing chamber from the breathing-pressure control chamber, means connecting the diaphragm with the demand valve for opening movement of the demand valve in response to breathing demand sensed in the demand pressure sensing chamber, means for supplying a bleed of breathing air to the breathing-pressure control chamber, valve means for restricting flow of breathing air from the breathing-pressure control chamber to ambient in response to signals received from a G sensitive valve mounted in the aircraft in which the regulator is installed whereby pressure in the breathing-pressure control chamber is increased to provide a delivery pressure at the regulator outlet appropriate to positive pressure breathing during periods of high or rapidly changing G load, and means comprising a passageway for by-passing the valve means so that a metered flow of pressurized air from the G sensitive valve may flow to the breathing-pressure control chamber to maintain control pressure therein, said last-named means including a non-return valve in said passageway, whereby pressure in the breathing-pressure control chamber may be rebuilt at a required rate to maintain satisfactory operation of the regulator following extreme excursions of the diaphragm.

* * * * *